Jan. 11, 1966    G. SCHAEFFLER    3,228,090
METHOD OF MAKING A CAGE FOR CYLINDRICAL ROLLERS
Filed Oct. 27, 1964    2 Sheets-Sheet 1

INVENTOR
GEORG SCHAEFFLER
BY
*Hammond & Littell*
ATTORNEYS

Jan. 11, 1966  G. SCHAEFFLER  3,228,090
METHOD OF MAKING A CAGE FOR CYLINDRICAL ROLLERS
Filed Oct. 27, 1964  2 Sheets-Sheet 2

INVENTOR
GEORG SCHAEFFLER
BY
*Hammond & Littell*
ATTORNEYS 3,228,090
METHOD OF MAKING A CAGE FOR
CYLINDRICAL ROLLERS
Georg Schaeffler, Herzogenaurach, near Nurnberg, Germany, assignor to Industriewerk Schaeffler OHG., Herzogenaurach, Germany, a corporation of Germany
Filed Oct. 27, 1964, Ser. No. 406,865
Claims priority, application Germany, Nov. 2, 1963,
J 24,667
4 Claims. (Cl. 29—148.4)

The invention relates to a novel cage for cylindrical rollers comprised of two annular rims connected to each other by crossbars which bound slots for accommodating the rollers and which guides the rollers in an axially parallel manner while retaining the rollers in both radial directions.

Many different forms of this type of cage are known and basically there are two classes of cages, namely the massive cages and the thin-walled sheet metal cages. The massive cages have a wall thickness which is close to the roller diameter while the sheet metal cages have a much smaller wall diameter. Due to the advantages and disadvantages of each type of cages, each type has only a limited field of use.

In massive cages, the production of the slots for accommodating the rollers by punching is sometimes made difficult if the diameter of the rollers and thus the wall thickness of the cage exceeds a certain amount. Also, with these massive cages, the retention of the rollers in both radial directions in itself always presents a special problem. Retaining the rollers in this way requires subsequent forming-on of retaining projections by plastic deformation on the cage bars whereby these projections project into the slots and thus prevent the rollers from falling out inwardly or outwardly. The production of such retaining projections always involves additional working operations and in many cases there is also a risk that the retaining projections will be damaged or broken off completely while the rollers are being introduced into the cage slots.

In the case of massive cages, use also has already been made of an advantage as far as the retaining of the rollers is concerned which results from the production of such cages by rolling-round from a flat strip. If the roller slots are first made in the flat strip and the strip is then rolled round, the neighboring surfaces of the cage bars become inclined during the rolling operation in such a manner that at an acute angle relative to one another their edges in the bore of the cage are spaced from one another at a distance which is less than the roller diameter whereby the rollers are retained in the radial inward direction. In this case, however, it is still necessary to form-on additional retaining projections in a separate working operation in order to retain the rollers externally in a radial sense.

In sheet metal cages, the cage bars are generally given an M-shape or W-shape in longitudinal sectional view for the purpose of guiding and retaining the rollers. These cages also have disadvantages which have prevented them from being generally used successfully in practical work. For example, such cages generally have such small guide surfaces for the rollers that a high rate of wear has to be expected. In addition, due to the small metal thickness of such cages, the cages do not possess very good shape-retaining properties so that even before mounting and certainly also during operation deformation may result whereby the satisfactory retaining and/or axially-parallel guiding of the rollers may be prejudiced.

It is an object of the invention to provide novel cages for cylindrical rollers which avoid the disadvantages of known cages.

It is another object of the invention to provide a novel method of forming cages for cylindrical rollers.

These and other objects and advantages of the invention will become obvious from the following detailed description.

The cage of the invention for cylindrical rollers is comprised of two annular rings connected together by crossbars which bound slots which accommodate the rollers and guides these rollers in axially parallel manner and retain them in both radial directions, the said crossbars having relatively thick end portions extending radially substantially within the pitch circle whose slot bounding surfaces are inclined toward each other at acute angles whereby the distance between their edges in the bore of the cage is less than the roller diameter and a relatively thin, offset middle portion disposed radially outwardly of the pitch circle and the distance between the slot bounding edges is less than the roller diameter.

The cage of the invention is a synthesis of the known massive cage and the sheet metal cage. The cage bars have portions of different radial thickness over their length i.e., they are of relatively considerable thickness similar to that used in massive cages over a certain length, namely in the regions where the rollers are to be retained in the inward direction. In these bar portions, the axially-parallel guiding of the rollers will generally also be effected. At the remaining bar portions, which are to be used for retaining the rollers in the radial outward direction, the bars are relatively thin, such as is used in the case of sheet metal cages.

The rollers are retained in the inward direction in a manner known per se, in that the slot-bounding surfaces of the relatively thick bar portions are inclined at an acute angle to one another in such a manner that their edges in the bore of the cage are spaced from one another at a distance which is less than the roller diameter. The rollers are retained in the radial outward direction by the relatively thin bar portions which extend exclusively radially outside the pitch circle and the slot bounding edges of which are to be spaced at a distance from one another which is less than the roller diameter. Since these relatively thin bar portions are outwardly offset, the rollers in such a cage may be inserted into the cage slots by snapping them in during which the relatively thin bar portions bounding the slots yielding laterally in a resilient manner.

The advantages of the cage of the invention reside particularly in that no additional retaining noses have to be formed on in special working operations to retain the rollers. The rollers are retained inwardly, as already stated, simply by the inclined setting of the bar surfaces, while the rollers are retained externally by punching the thin-walled bar portions to a relatively considerable width so that the boundary edges of the bars are spaced from one another at distances which are less than the roller diameter. In addition, there is the further advantage that in the cage guide zones of adequate length are made available for the guiding of the rollers along the boundary surfaces at the relatively thick-walled bar portions so that in these regions only very slight wear is to be expected. Also, the cage, due to the partially thick-walled construction, has substantially greater shape-retaining properties than known sheet metal cages and thus considerably widens the possibilities of using such cages.

A further advantage of the cage of the invention is that it can be produced in a particularly simple manner, by first forming the cage slots in a flat strip which is then rolled round and welded, for example, at the abutting ends. Naturally, it is also possible in this way to produce a cage which consists of two so-called half-shells i.e., two semi-cylindrical parts.

The method of the invention of making the novel cages for cylindrical rollers comprises (a) punching transverse slots for accommodating the rollers in a flat straight sheet metal strip having a cross-sectional thickness at both longitudinal sides approximately one half of the roller diameter and having on one side between the longitudinal sides a groove-like recess having a cross-sectional thickness approximately one quarter of the roller diameter, the said slots being slightly wider than the roller diameter in the thicker portions of the sheet metal strip and narrower than the roller diameter in the thinner portions of the strip, (b) offsetting the central thinner portion of the sheet metal strip in the direction opposite to the groove like recess so the strip has a cross-sectional thickness of approximately three-quarters of the roller diameter and (c) forming the flat sheet metal strip into a cylindrical cage with the offset central portion of the cage bars on the outer periphery. The formation of the cylindrical cage in the last step may be made by bending the metal strip cylindrically and joining the two ends or bending two such metal strips semi-cylindrically and joining the ends thereof. Steps A and B can also be performed in reverse sequence.

This method provides a cage wherein the rollers are retained internally by the per se known narrowing of the cage slots which is obtained when the strip is bent-round, while the rollers are retained in the outer radial sense by a thin-walled, offset bar portion similar to the case with cages made of thin-walled sheet metal. This construction affords the advantage that retaining noses do not have to be formed subsequently on the cage, but instead they are obtained on the one hand by the profiling of the sheet metal strip and on the other hand by the appropriate punching of the slots. Relatively long guide zones for the rollers which are disposed in the roller pitch circle are additionally obtained at the portions of the sheet metal strip which are relatively thick and which also adjoin in a desirable manner the ends of the rollers. Also, such a cage is made extremely stable in form by the considerable wall thickness provided at its axial ends so that no undesirable deformations can result when the strip is bent-round.

Referring now to the drawing which illustrates various views of one cage embodiment of the invention during its manufacture:

Figure 1:
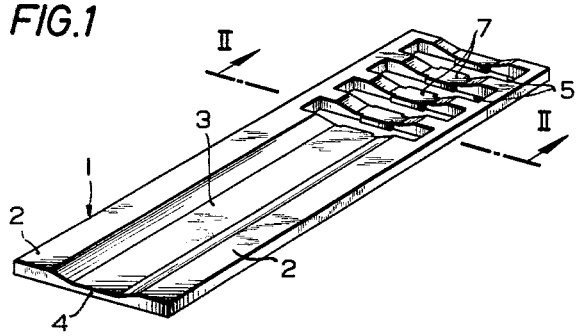
FIG. 1 is a plan view of a flat sheet metal strip in which part of the slots have been punched.

The method of the invention starts with a blank consisting of a flat, straight sheet metal strip 1 with a cross-section such that at both longitudinal edges 2 it has a thickness approximately one half the roller diameter and in the region between the edges the strip has on one side a groove-like recess 3 which is of such a depth that in the central region 4 the thickness is approximately ¼ of the roller diameter. Slots 5 are punched in the strip for accommodating the rollers and these slots are slightly wider than the roller diameter in the regions 2, while in the region 4 they are narrower than the roller diameter.

Figure 2:
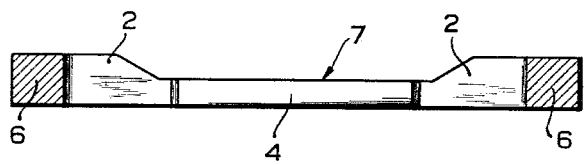
FIG. 2 is a cross-sectional view of the embodiment of FIG. 1 on the line II—II.

FIGURE 2 shows a cross-section through the flat sheet metal strip 1 after the slots have been punched in it and also shows clearly the cross-sectional form of the sheet metal strip. It further shows that at the ends of the punched slots 5, portions of material 6 remain which in the finished cage form the annular end rings connecting the cage bars 7 to one another.

Figure 3:
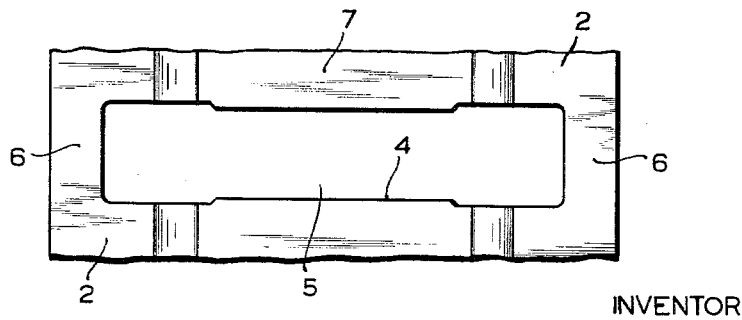
FIG. 3 is a partial plan view of the sheet metal strip of FIG. 1.

FIGURE 3, which is a plan view of the punched cage strip, shows that the slot 5 is punched so that it has different widths in such a manner that in the region 4 of the cage bars 7 the slot is narrower than the diameter of the rollers which will be inserted into the completed cage.

Figure 4:
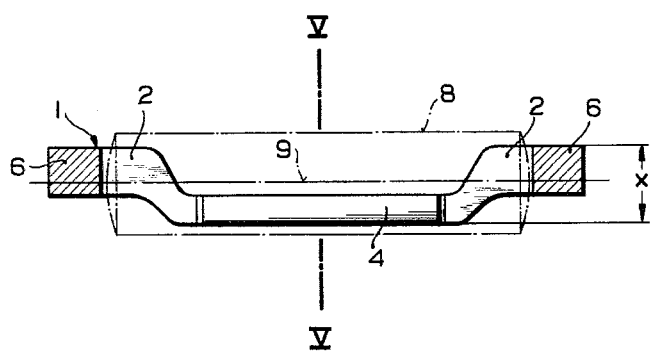
FIG. 4 is a cross-sectional view through the sheet metal strip after the crossbars have been offset and FIG. 5 is a fragmentary view of the completed cage after the rollers have been introduced into the cage along the line V—V of FIG. 4.

FIGURE 4 shows the flat sheet metal strip 1 in the state in which it is to be found after the next step in the method has been carried out. In this step, the cage bars 7 are offset in their central region 4 so that a total cage thickness $x$ is obtained which amounts to approximately ¾ of the roller diameter. This offsetting enables the bar portion 4 to retain the roller 8 (shown in dot-dash lines) in one direction due to the fact that the bar portions 4, which are spaced from one another at a distance which is less than the roller diameter, are situated at one side of the roller center line or pitch circle 9 indicated by a dot-dash line.

Figure 5:
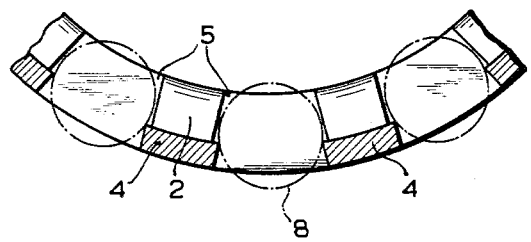

In the next step of the method, the sheet metal strip thus prepared is bent to a semi-cylindrical or cylindrical shape whereby a cage such as is shown in the fragmentary view in FIGURE 5 is obtained. This sectional view shows how when the strip is bent-round, the surfaces of the bar portions 2 which face towards the cage slots 7 approach one another in the radial inward direction, which guarantees that the roller 8 shall be retained in the radial inward direction. FIGURE 5 also shows how the rollers are retained externally by the offset bar portions 4, which also are wider than the bar portions 2. The rollers 8 may be snapped from the outside into such a cage in known manner during which the bar portions 4 yield elastically in the peripheral direction.

Various modifications of the cage and method of the invention may be made without departing from the spirit or scope thereof and it is to be understood that the invention is to be limited only as defined in the appended claims.

I claim:

1. A method of making a cage for cylindrical rollers which will guide the rollers in axially parallel manner and retain them in both radial directions comprising punching transverse slots for accommodating the rollers in a flat straight sheet metal strip having on one side a groove-like recess between the two longitudinal sides with a thinner cross-section than the longitudinal sides, the slots being slightly wider than the roller diameter in the thicker longitudinal sides and narrower than the roller diameter in the thinner groove-like recess; offsetting the central thinner portion of metal strip in the direction opposite to the groove-like recess and forming the sheet metal strip into a cylindrical cage with the offset central portion of the cage bars on the outer periphery.

2. A method of making a cage for cylindrical rollers which will guide the rollers in axially parallel manner and retain them in both radial directions comprising offsetting the central thinner portion of a flat straight sheet metal strip having on one side a groove-like recess with a thinner cross-section than the longitudinal sides in the direction opposite to the groove-like recess, punching transverse slots in the sheet metal strips which are slightly wider than the roller diameter in the thicker longitudinal sides and narrower than the roller diameter in the offset thinner portion and forming the sheet metal strip into a cylindrical cage with the offset central portion of the cage bars on the outer periphery.

3. A method of making a cage for clyindrical rollers which will guide the rollers in axially parallel manner and retain the rollers in both radial directions comprising (a) punching transverse slots for accommodating the rollers in a flat straight sheet metal strip having a cross-sectional thickness at both longitudinal sides approximately one half of the roller diameter and having on one side between the longitudinal sides a groove-like recess having a cross-sectional thickness approximately one quarter of the roller diameter, the said slots being slightly wider than the roller diameter in the thicker portions of the sheet metal strip and narrower than the roller diameter in the thinner portions of the strip, (b) offsetting the central thinner portion of the sheet metal strip in the direction opposite to the groove-like recess so the strip has a cross-sectional thickness of approximately three-quarters of the roller diameter and (c) forming the flat sheet metal strip into a cylindrical cage with the offset central portion of the cage bars on the outer periphery.

4. The method of claim 3 wherein the offsetting step is performed before the punching of the transverse slots.

References Cited by the Examiner

UNITED STATES PATENTS

| | | | |
|---|---|---|---|
| 1,173,719 | 2/1916 | Hirth | 308—217 |
| 1,442,978 | 1/1923 | Shafer | 308—217 |
| 2,848,791 | 8/1958 | Neese | 29—148.4 |
| 3,080,639 | 3/1963 | Maurzi et al. | 29—148.4 |
| 3,173,192 | 3/1965 | Smith | 29—148.4 |

WHITMORE A. WILTZ, *Primary Examiner.*

THOMAS H. EAGER, *Examiner.*